(12) United States Patent
Potter et al.

(10) Patent No.: US 7,840,611 B2
(45) Date of Patent: Nov. 23, 2010

(54) HIGH AVAILABILITY FOR EVENT FORWARDING

(75) Inventors: Timothy A. Potter, Denver, CO (US);
Mitch Upton, Highlands Ranch, CO (US); Christa Golding, Littleton, CO (US)

(73) Assignee: Oracle International Corporation, Redwood Shores, CA (US)

( * ) Notice: Subject to any disclaimer, the term of this patent is extended or adjusted under 35 U.S.C. 154(b) by 461 days.

(21) Appl. No.: 11/685,169

(22) Filed: Mar. 12, 2007

(65) Prior Publication Data

US 2007/0156884 A1     Jul. 5, 2007

Related U.S. Application Data

(63) Continuation of application No. 11/559,344, filed on Nov. 13, 2006, now abandoned, which is a continuation of application No. 10/293,656, filed on Nov. 13, 2002, now Pat. No. 7,155,438.

(60) Provisional application No. 60/376,960, filed on May 1, 2002.

(51) Int. Cl.
*G06F 17/30* (2006.01)
*G06F 7/00* (2006.01)

(52) U.S. Cl. .................................................. 707/809

(58) Field of Classification Search ............... 707/2, 707/102, 6, 100, 7, 809; 705/7
See application file for complete search history.

(56) References Cited

U.S. PATENT DOCUMENTS

| | | | |
|---|---|---|---|
| 5,283,897 A | 2/1994 | Georgiadis et al. | |
| 5,469,562 A | 11/1995 | Saether | |
| 5,592,664 A * | 1/1997 | Starkey | 707/1 |
| 5,604,860 A | 2/1997 | McLaughlin et al. | |
| 5,630,131 A | 5/1997 | Palevich et al. | |

(Continued)

FOREIGN PATENT DOCUMENTS

CA     2248634     3/2000

(Continued)

OTHER PUBLICATIONS

Richter, Jeffrey, "Advanced Windows Programming", 1996, Microsoft Press (TM), pp. 697-699. (was provided during parent application examination).*

(Continued)

*Primary Examiner*—Kuen S Lu
(74) *Attorney, Agent, or Firm*—Fliesler Meyer LLP

(57) ABSTRACT

High availability event forwarding can be obtained utilizing distributed queues in a server cluster. Each server can receive an event from a data system, such as a database or SAP™ system. Event queues exist on servers in the cluster can store an event until, for example, the event is delivered to a user or retrieved for processing. An event processor examines the load of each event queue and selects the event queue with the lightest load. The event processor generates an alias for the selected queue, such that a user, integration system, or client application does not need to know the identity of the physical queue storing the event, but only needs to refer to the 'distributed queue' or alias. After a physical queue is selected and an alias assigned, the event is forwarded to the selected queue.

17 Claims, 2 Drawing Sheets

U.S. PATENT DOCUMENTS

| | | | |
|---|---|---|---|
| 5,721,825 A | 2/1998 | Lawson et al. | |
| 5,892,913 A | 4/1999 | Adiga et al. | |
| 5,944,794 A | 8/1999 | Okamoto et al. | |
| 5,951,694 A | 9/1999 | Choquier et al. | |
| 5,966,535 A | 10/1999 | Benedikt et al. | |
| 5,991,808 A * | 11/1999 | Broder et al. | 709/226 |
| 6,012,083 A | 1/2000 | Savitzky et al. | |
| 6,016,495 A | 1/2000 | McKeehan et al. | |
| 6,018,730 A | 1/2000 | Nichols et al. | |
| 6,021,443 A * | 2/2000 | Bracho et al. | 709/241 |
| 6,023,578 A | 2/2000 | Birsan et al. | |
| 6,023,722 A | 2/2000 | Colyer | |
| 6,029,000 A | 2/2000 | Woolsey et al. | |
| 6,067,623 A | 5/2000 | Blakley et al. | |
| 6,070,184 A | 5/2000 | Blount et al. | |
| 6,078,943 A | 6/2000 | Yu | |
| 6,119,143 A | 9/2000 | Dias et al. | |
| 6,128,279 A * | 10/2000 | O'Neil et al. | 370/229 |
| 6,148,336 A | 11/2000 | Thomas et al. | |
| 6,185,734 B1 | 2/2001 | Saboff et al. | |
| 6,195,680 B1 | 2/2001 | Goldszmidt et al. | |
| 6,212,546 B1 | 4/2001 | Starkovich et al. | |
| 6,230,309 B1 | 5/2001 | Turner et al. | |
| 6,233,607 B1 | 5/2001 | Taylor et al. | |
| 6,237,135 B1 | 5/2001 | Timbol | |
| 6,243,737 B1 | 6/2001 | Flanagan et al. | |
| 6,253,230 B1 | 6/2001 | Couland et al. | |
| 6,311,327 B1 | 10/2001 | O'Brien et al. | |
| 6,317,786 B1 | 11/2001 | Yamane et al. | |
| 6,330,602 B1 * | 12/2001 | Law et al. | 709/224 |
| 6,334,114 B1 | 12/2001 | Jacobs et al. | |
| 6,360,358 B1 | 3/2002 | Elsbree et al. | |
| 6,367,068 B1 | 4/2002 | Vaidyanathan et al. | |
| 6,374,297 B1 | 4/2002 | Wolf et al. | |
| 6,377,939 B1 | 4/2002 | Young | |
| 6,470,364 B1 | 10/2002 | Prinzing | |
| 6,516,322 B1 | 2/2003 | Meredith | |
| 6,584,454 B1 | 6/2003 | Hummel et al. | |
| 6,587,959 B1 | 7/2003 | Sjolander et al. | |
| 6,594,786 B1 | 7/2003 | Connelly et al. | |
| 6,601,113 B1 | 7/2003 | Koistinen et al. | |
| 6,609,115 B1 | 8/2003 | Mehring et al. | |
| 6,615,258 B1 | 9/2003 | Barry et al. | |
| 6,636,491 B1 | 10/2003 | Kari et al. | |
| 6,637,020 B1 | 10/2003 | Hammond | |
| 6,643,652 B2 | 11/2003 | Helgeson et al. | |
| 6,654,932 B1 | 11/2003 | Bahrs et al. | |
| 6,662,357 B1 | 12/2003 | Bowman-Amuah | |
| 6,684,388 B1 | 1/2004 | Gupta et al. | |
| 6,687,702 B2 | 2/2004 | Vaitheeswaran et al. | |
| 6,721,740 B1 | 4/2004 | Skinner et al. | |
| 6,721,779 B1 | 4/2004 | Maffeis | |
| 6,754,181 B1 * | 6/2004 | Elliott et al. | 370/252 |
| 6,754,884 B1 | 6/2004 | Lucas et al. | |
| 6,789,054 B1 | 9/2004 | Makhlouf | |
| 6,799,718 B2 | 10/2004 | Chan et al. | |
| 6,823,495 B1 | 11/2004 | Vedula et al. | |
| 6,826,260 B1 * | 11/2004 | Vincze et al. | 379/15.02 |
| 6,832,238 B1 | 12/2004 | Sharma et al. | |
| 6,836,883 B1 | 12/2004 | Abrams et al. | |
| 6,859,180 B1 | 2/2005 | Rivera | |
| 6,859,834 B1 * | 2/2005 | Arora et al. | 709/227 |
| 6,874,143 B1 | 3/2005 | Murray et al. | |
| 6,910,154 B1 | 6/2005 | Schoenthal | |
| 6,918,084 B1 | 7/2005 | Slaughter et al. | |
| 6,922,827 B2 | 7/2005 | Vasilik et al. | |
| 6,950,872 B2 | 9/2005 | Todd, II | |
| 6,971,096 B1 | 11/2005 | Ankireddipally et al. | |
| 7,000,219 B2 | 2/2006 | Barrett et al. | |
| 7,017,146 B2 | 3/2006 | Dellarocas et al. | |
| 7,043,722 B2 | 5/2006 | Bau, III | |
| 7,051,072 B2 | 5/2006 | Stewart et al. | |
| 7,051,316 B2 | 5/2006 | Charisius et al. | |
| 7,062,718 B2 | 6/2006 | Kodosky et al. | |
| 7,069,507 B1 | 6/2006 | Alcazar et al. | |
| 7,072,934 B2 | 7/2006 | Helgeson et al. | |
| 7,073,167 B2 | 7/2006 | Iwashita | |
| 7,080,092 B2 | 7/2006 | Upton | |
| 7,089,584 B1 | 8/2006 | Sharma | |
| 7,096,422 B2 | 8/2006 | Rothschiller et al. | |
| 7,111,243 B1 | 9/2006 | Ballard et al. | |
| 7,117,504 B2 | 10/2006 | Smith et al. | |
| 7,127,507 B1 * | 10/2006 | Clark et al. | 709/224 |
| 7,143,186 B2 | 11/2006 | Stewart et al. | |
| 7,146,422 B1 | 12/2006 | Marlatt et al. | |
| 7,155,705 B1 | 12/2006 | Hershberg et al. | |
| 7,165,041 B1 | 1/2007 | Guheen et al. | |
| 7,181,731 B2 | 2/2007 | Pace et al. | |
| 7,184,967 B1 | 2/2007 | Mital et al. | |
| 7,240,331 B2 | 7/2007 | Vion-Dury et al. | |
| 7,260,599 B2 | 8/2007 | Bauch et al. | |
| 7,260,818 B1 | 8/2007 | Iterum et al. | |
| 2002/0010781 A1 | 1/2002 | Tuatini | |
| 2002/0032769 A1 | 3/2002 | Barkai et al. | |
| 2002/0049788 A1 | 4/2002 | Lipkin et al. | |
| 2002/0073396 A1 | 6/2002 | Crupi et al. | |
| 2002/0083075 A1 | 6/2002 | Brummel et al. | |
| 2002/0099579 A1 | 7/2002 | Stowell et al. | |
| 2002/0111922 A1 | 8/2002 | Young et al. | |
| 2002/0116454 A1 | 8/2002 | Dyla et al. | |
| 2002/0120685 A1 | 8/2002 | Srivastava et al. | |
| 2002/0143960 A1 | 10/2002 | Goren et al. | |
| 2002/0161826 A1 | 10/2002 | Arteaga et al. | |
| 2002/0169644 A1 | 11/2002 | Greene | |
| 2002/0174178 A1 | 11/2002 | Stawikowski | |
| 2002/0174241 A1 | 11/2002 | Beged-Dov et al. | |
| 2002/0184610 A1 | 12/2002 | Chong et al. | |
| 2002/0188486 A1 | 12/2002 | Gil et al. | |
| 2002/0194244 A1 | 12/2002 | Raventos | |
| 2002/0194267 A1 | 12/2002 | Flesner et al. | |
| 2002/0194495 A1 | 12/2002 | Gladstone et al. | |
| 2003/0004746 A1 | 1/2003 | Kheirolomoom et al. | |
| 2003/0005181 A1 | 1/2003 | Bau et al. | |
| 2003/0009511 A1 * | 1/2003 | Giotta et al. | 709/201 |
| 2003/0018661 A1 | 1/2003 | Darugar | |
| 2003/0018832 A1 | 1/2003 | Amirisetty et al. | |
| 2003/0018963 A1 | 1/2003 | Ashworth et al. | |
| 2003/0023957 A1 | 1/2003 | Bau et al. | |
| 2003/0028364 A1 | 2/2003 | Chan et al. | |
| 2003/0028579 A1 | 2/2003 | Kulkarni et al. | |
| 2003/0043191 A1 | 3/2003 | Tinsley et al. | |
| 2003/0046591 A1 | 3/2003 | Asghari-Kamrani et al. | |
| 2003/0051066 A1 | 3/2003 | Pace et al. | |
| 2003/0055868 A1 | 3/2003 | Fletcher et al. | |
| 2003/0055878 A1 | 3/2003 | Fletcher et al. | |
| 2003/0074217 A1 | 4/2003 | Beisiegel et al. | |
| 2003/0079029 A1 | 4/2003 | Garimella et al. | |
| 2003/0084203 A1 | 5/2003 | Yoshida et al. | |
| 2003/0105805 A1 * | 6/2003 | Jorgenson | 709/203 |
| 2003/0126136 A1 | 7/2003 | Omoigui | |
| 2003/0220967 A1 | 11/2003 | Potter et al. | |
| 2004/0015368 A1 | 1/2004 | Potter et al. | |
| 2004/0040011 A1 | 2/2004 | Bosworth et al. | |
| 2004/0078373 A1 | 4/2004 | Ghoneimy et al. | |
| 2004/0078440 A1 | 4/2004 | Potter et al. | |
| 2004/0103406 A1 | 5/2004 | Patel | |
| 2004/0148336 A1 | 7/2004 | Hubbard et al. | |
| 2004/0194087 A1 | 9/2004 | Brock et al. | |
| 2004/0204976 A1 | 10/2004 | Oyama et al. | |
| 2005/0050068 A1 | 3/2005 | Vaschillo et al. | |
| 2005/0278585 A1 | 12/2005 | Spencer | |
| 2006/0206856 A1 | 9/2006 | Breeden et al. | |
| 2006/0234678 A1 | 10/2006 | Juitt et al. | |

| | | |
|---|---|---|
| 2007/0038500 A1 | 2/2007 | Hammitt et al. |

FOREIGN PATENT DOCUMENTS

| | | |
|---|---|---|
| WO | WO9923558 | 5/1999 |
| WO | WO 0029924 | 5/2000 |

OTHER PUBLICATIONS

Mohan et al., "Aries: A Transaction Recovery Method Supporting Fine-Granularity Locking and Partial Rollbacks Using Write-Ahead Logging", ACM Transactions on Database Systems (TODS), Mar. 1992, pp. 94-162, vol. 17, Issue 1.

Bogunovic, "A Programming Model for Composing Data Flow Collaborative Applications", Proceedings of the IEEE International Conference on Engineering of Computer Based Systems, Mar. 7-12, 1999, pp. 106-112.

Sung et al., "A Multimedia Authoring Tool for the Internet", IEEE Transactions on Consumer Electronics, 1997. pp. 304-308.

Smith, et al. "Marching Towards a Software Reuse Future", ACM Ada Letters, Nov./Dec. 1994, pp. 62-72 vol. 14, No. 6.

HP, "HP Application Server Developers's Guide," Version 8.0, Hewlett-Packard Company, 1999-2001, pp. 27-81, 127-160, 195-271.

Sharma, "J2EE Connector Architecture Specification, Version 1.0 Final Release", Java 2 Enterprise Edition, Aug. 2001, 90 pages, Sun Microsystems.

Allamaraju, et al., "Professional Java Server Programming J2EE 1.3 Edition", Sep. 2001, pp. 1009-1057, WROX.

Alonso et al., "Advanced Transaction Models in Workflow Contexts", IEEE, Feb. 1996, Proceedings of 12th International Conference on Data Engineering, retrieved from: http://citeseer.ist.psu.edualonso96advanced.html., pp. 574-581.

Van Der Aalst et al., "XML Based Schema Definition for Support of Inter-Organizational Workflow", University of Colorado and University of Eindhoven report, 2000, retrieved from http://citeseer.ist.psu.edu/vanderaalst00mxl.html, 39 pages.

Plaindoux, "XML Transducers in Java", May 2002, The Eleventh International World Wide Conference, retrieved from: http://www2002.org/CDROM/poster/132/index.html., 6 pages.

Supplementary European Search Report for EP 02784131.1 dated Aug. 8, 2007, 4 pages.

Microsoft, "Microsoft.net Framework", Microsoft Corporation, 2001, 54 pages.

Willink, "Meta-Compilation for C ++", University of Surrey, Jan. 4, 2000, 379 pages.

Bea Systems, Inc., "Transforming Data Using Xquery Mapper", Bea AquaLogic Service Bus 2.0 Documentation, 2006, 19 pages.

Stylus Studio, "Xquery Mapper", 2007, 6 pages, Stylus Studios.

ALTOVA, "XML-toXML Mapping", 2007, 3 pages, Altova Map Force.

Jamper, "Jamper-Java XML Mapper", 2007, 4 pages, Sourceforge.

Peltz, "Web Services Orchestration" Hewlett-Packard, Jan. 2003, 20 pages.

Muller, "Event-Oriented Dynamic Adaptation of Workflows: Model, Architecture and Implementation", 2002, 351 pages, University of Leipzg, Germany.

Richter, "Advanced Windows Programming", 1996, pp. 697-699, Microsoft Press(TM).

Richter, Jeffrey, "Advanced Windows," Third Edition, Microsoft Press, Copyright (c) 1997, Cover sheet and index, pp. 697-699.

* cited by examiner

HIGH AVAILABILITY FOR EVENT FORWARDING

CLAIM OF PRIORITY

This application is a continuation of U.S. patent application Ser. No. 11/559,344 filed Nov. 13, 2006, entitled "HIGH AVAILABLILITY FOR EVENT FORWARDING" now abandoned, which is a continuation of U.S. patent application Ser. No. 10/293,656 filed Nov. 13, 2002, now U.S. Pat. No. 7,155,438, issued Dec. 26, 2006, entitled "HIGH AVAILABILITY FOR EVENT FORWARDING", which claims priority to U.S. Provisional Patent Application No. 60/376,960 filed May 1, 2002, entitled "HIGH AVAILABILITY FOR EVENT FORWARDING," which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194, now U.S. Pat. No. 7,080,092, entitled "Application View Component for System Integration," by Mitch Upton, filed Oct. 15, 2002.

U.S. patent application Ser. No. 10/293,059 entitled "High Availability for Asynchronous Reguest," by Tim Potter et al., filed Nov. 13, 2002.

U.S. patent application Ser. No. 10/293,655 entitled "High Availability Application View Deployment," by Tim Potter et al., filed Nov. 13, 2002.

U.S. patent application Ser. No. 10/293,674 entitled "High Availability Event Topic," by Tim Potter et al., filed Nov. 13, 2002.

FIELD OF THE INVENTION

The present invention relates to the forwarding of events and messages to users in a cluster or across a network.

BACKGROUND

In present application integration (AI) systems, there can be several single points of failure. These single points of failure can include deployment or management facilities, event forwarding, event topics, remote clients, event subscriptions, response listeners, and response queues. Each of these features is tied to a single server within a server cluster. If that single server crashes, the entire AI application can become irreparably damaged and must be rebooted via a server reboot.

An AI component can generate events, such as through the use of adapters, that a user may wish to consume through a service such as business process management (BPM). An event forwarding facility of a present AI system forwards events between an application view and a physical BPM event queue. This facility is a single point of failure as well as a performance bottleneck.

BRIEF SUMMARY

Systems and methods in accordance with the present invention can overcome deficiencies in prior art systems by providing for high availability event forwarding. In a server cluster, each server can receive an event from a data source, such as a database or SAP™ system. An event queue resides on at least one of the servers in the cluster, which is capable of storing an event. An event queue can store an event until, for example, the event is delivered to a user or retrieved for processing.

An event processor exists on at least one of the servers in the cluster. The event processor can examine the load of each event queue in the cluster and determine which event queue has the lightest load. The event processor can generate an alias for the selected queue, such that a user, integration system, or client application, for example, can locate the event by specifying the alias. The user does not need to know the identity of the actual physical queue in which the event is stored, but only refers to the 'distributed queue' or alias used to locate the actual physical queue. After the event processor selects a physical queue to act as the distributed queue and assigns an alias, the event can be forwarded to that physical queue.

Other features, aspects, and objects of the invention can be obtained from a review of the specification, the figures, and the claims.

DETAILED DESCRIPTION

Figure 1:
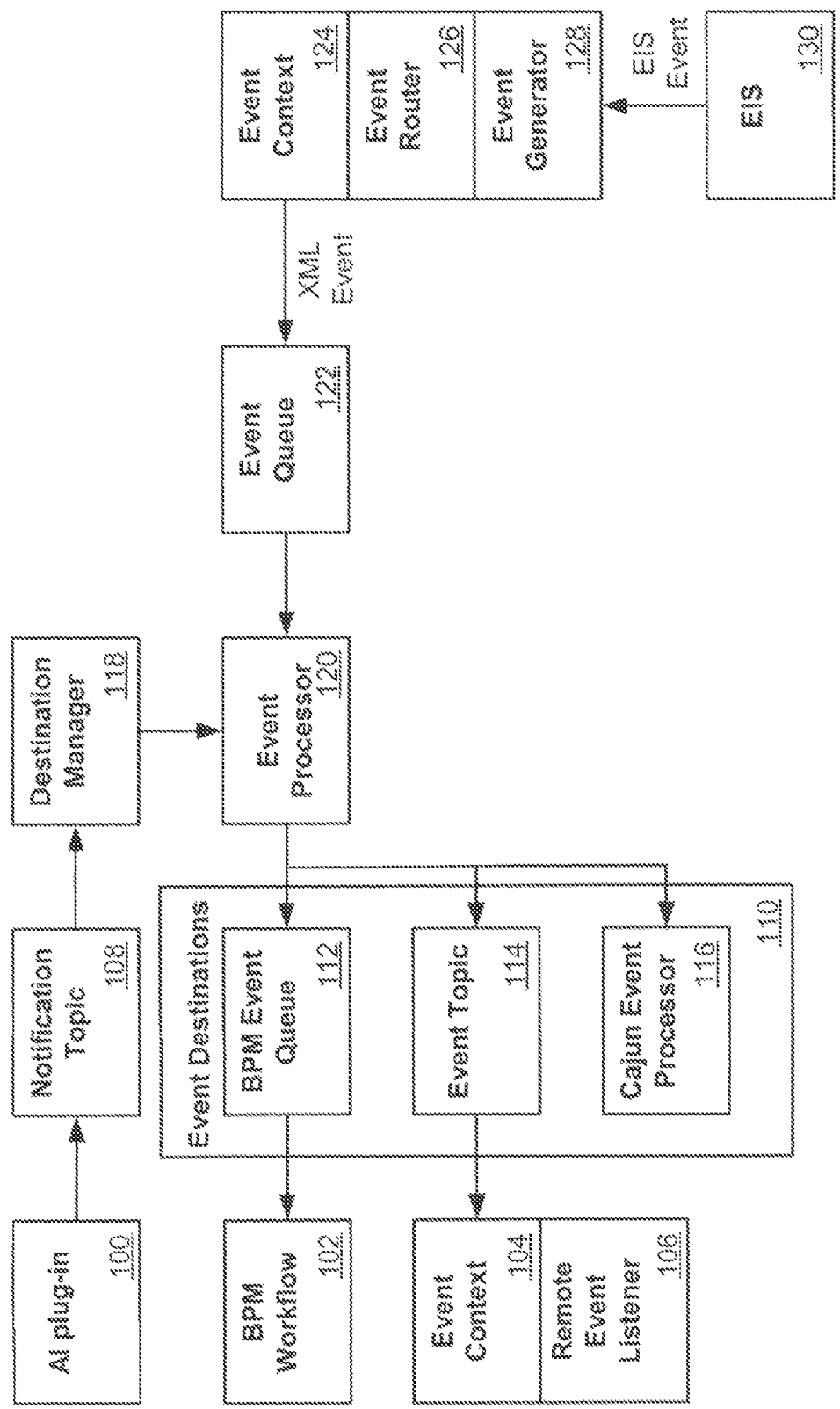
FIG. 1 is a diagram of a system in accordance with one embodiment of the present invention.

A system and method in accordance with one embodiment of the present invention overcomes deficiencies in prior art systems by changing the way in which events are routed throughout an AI system. In present messaging systems, an event router, which can be tightly coupled to an SAP™ system or database, can receive an event out of the SAP™ system or database and send that event into an integration server. The integration server propagates the event out to anybody who is interested in the event, such as anyone having registered a listener for events of that type. Events can also be propagated to subscribers of an event topic to which that event belongs. Event forwarding is one mechanism for propagating these messages. In present systems, events are forwarded by an event router to a physical queue, from which interested users or clients can retrieve the events. This physical queue is a single point of failure.

In a system in accordance with one embodiment of the present invention, event forwarding is highly available. High availability can be accomplished through the use of distributed queues and/or topics. A distributed queue can server as an alias, and is not a physical queue in a specific server. A highly-available approach allows a user to send a message to a distributed queue. A server in the cluster, such as the one receiving the message, can determine which server in the cluster contains the physical queue with the lightest load that is online and working properly.

After determining which physical queue should receive the message, the server can find that physical queue and put the message on the queue. The user can be unaware of which queue is being used, and may not care. To the user, the message is sent to the alias, or distributed queue. This system is similar to a front end, in that it allows a messaging implementation such as JMS to be highly available, without requiring substantial work on the part of a client. When using a distributed event queue for event forwarding, it is possible to rely on the underlying JMS to do a lot of the high availability work.

Event forwarding in accordance with the present invention can be used with multiple event topics, or with a single distributed event topic. An AI system can create a single JMS Topic for each topic subscriber. Events for a given subscriber can be sent to the topic for the subscriber. Event delivery can also be consolidated onto a single JMS Queue, such as EVENT_QUEUE, for example. This queue can be a distributed queue with multiple physical destinations. A message driven bean (MDB), which can be referred to as an 'AI Event Processor', can listen on the EVENT_QUEUE distributed destination. An onMessage implementation for the MDB can deliver a copy of the event into the BPM event processor, such as if BPM is installed and running in the server instance.

The onMessage implementation can also publish a copy of the event onto an event topic, or "EVENT_TOPIC". An event topic is a distributed JMS topic that handles the delivery of events to remote application view clients. An application view class can be modified to create an event context on the event topic. The event context class can be modified to filter messages based on the application view name, which can be stored in a 'SourceKey' JMS header property.

The implementation can deliver a copy of the event into an application view Cajun Control event processor, if such a control is being used. Also, any dequeuing or execution for the implementation can be done transactionally to allow the message to be rolled back onto the queue in the event of a processing failure Using a queue and MDB approach allows exactly one copy of each event to be delivered into a system such as BPM and Cajun, while still using distributed destinations. The use of topics would yield multiple copies if distributed destinations were used. This approach also provides the continued ability to support event delivery to remote application view clients. High availability can be obtained by virtue of the distributed EVENT_QUEUE destination. Multiple servers can participate in the processing of messages for this queue, and thus a single server failure can be accommodated.

This approach also provides for better efficiency, as events can be routed directly to a BPM event processor and application view Cajun Control event processor without requeuing a copy of the message, which can have associated persistence and delivery overhead. A secondary publish to an EVENT_TOPIC can be somewhat costly, but the BPM event processors can be processing the event before the event is sent to the event topic, allowing more direct processing into BPM.

FIG. 1 shows a system that can be used for high-availability event processing in an application integration engine. In an example of event processing, an event occurs in an enterprise information system (EIS) 130. The event data is transferred to an event generator 128 in the resource adapter. The event generator 128 transforms the EIS-specific event data into an XML document and posts an event object, such as an IEvent object, to the event router 126. The event router 126 passes the event object to an event context object 124 for each AI server that is interested in the specific event type. The event context object 124 encapsulates the event object into a JMS object message and sends it to the event queue 122, such as a JMS Queue bound at JNDI context: com.ai.EVENT_QUEUE using a JMS QueueSender. This queue can be a distributed queue, in that the selected queue exists somewhere in the cluster but uses the same alias.

The event object message is stored in the event queue 122 until it is retrieved for processing by the AI event processor 120, which can process events in a first-in-first-out (FIFO) manner. It may not be enough to send a message to a distributed queue and expect the message to be received by a receiver of that distributed queue. There can be a receiver, or "QueueReceiver", receiving or listening on each physical queue to which an event could be forwarded. Thus, an AI event processor can be deployed on all nodes in a cluster. Multiple event processor deployment can further prevent single points of failure.

The event processor 120 can forward the event to all registered event destinations 110, which in the Figure include a BPM event queue 112, an event topic 114, and a Cajun event processor 116. Event destinations can be added by posting a message to a notification topic 108 for application integration. For example, when an AI plug-in 100 for BPM is deployed, it can send an "addDestination" message to the notification topic to register the BPM event queue 112 as an event destination. The BPM event queue can be a distributed queue. A message published on the notification topic can have cluster-wide visibility. Each node in the cluster can have a singleton event destination manager 118 that is a durable subscriber to this topic. Thus, the message can be published to every event destination manager in the cluster.

The event processor can use a singleton event destination manager 118 to listen for add/remove event destination messages on the notification topic 108 to configure the list of event destinations 110. The event object message can be delivered to all registered event destinations in a single transaction, such as in a single Java™ Transaction API (JTA) user transaction. If a post to any event destination 110 fails, the event message can be rolled back to the distributed queue 122. The roll back can use the same alias, but can forward the event to a different physical queue in the cluster. If the event processor 120 receives a message such as one that has "getJMSRedelivered( )" true, the post can be tried again. If the retry fails, the message can be sent to an error queue, which can be a distributed queue for failed event and asynchronous service response messages.

If an AI plug-in 100 for BPM is deployed, the plug-in can add the BPM event queue 112 as an event destination during startup so that AI events are passed to a BPM workflow 102 for processing. If there are any registered application view event listeners 106, the event can be sent to an event topic 114 which will use event context 104 to establish a connection with the remote event listener 106 for the application view.

Figure 2:
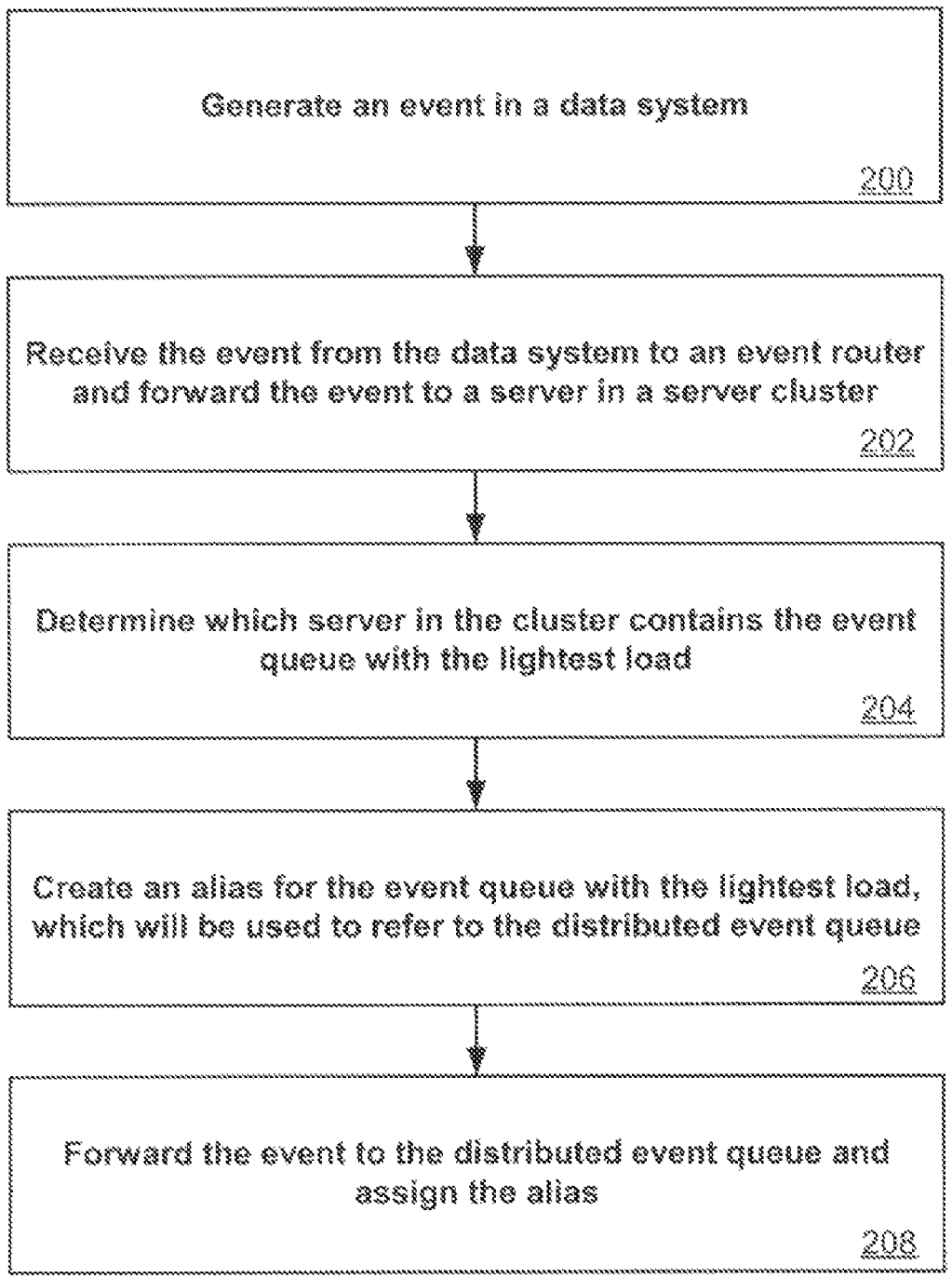
FIG. 2 is flowchart for a method that can be used with the system of FIG. 1.

FIG. 2 shows the steps of a method that can be used with the system of FIG. 1. An event is generated in a data system, such as a database or SAP™ system 200. An event router receives the event from the data system and forwards it to a server in the cluster 202. The server receiving the event determines which server in the cluster contains the event queue with the lightest load 204. The server then creates an alias for the event queue with the lightest load, which will be used to refer to the distributed event queue containing the event 206. The server then forwards the event to the distributed event queue and assigns the alias 208.

An event context class is a frame of reference that can be used to generate and/or receive events. An event context class can be used by an application view to manage the event delivery mechanics in methods such as postEvent and addEventListener. An application view can represent a subset of business functionality that is available, for example, within an EIS. The application view can accept requests for service invocation from a client, and can invoke the proper system functions within the target EIS. An application view can make use of connections provided by a resource adapter to communicate with the EIS.

A service can be a named business function. An application view can manage mapping from the name of the service to the system function in the EIS. Services can expose a simple XML-based request and response interface. Services can return a document definition object for request and response document types that describe the structure and content required for the document type.

An application view can utilize metadata that includes information such as a service name and associated system function. The metadata can also store at least some of the data needed to successfully invoke the system function. As a result, the service can require less request data from the client invoking service, as the application view can augment the data passed by the client with the stored metadata. This is a convenient way to hide the complexity of the underlying system function invocation from the client invoking a service.

In the event of the crash of a cluster server or managed server, an Al application can continue delivering events from adapters running in nodes that are still available. Event generators or routers running in the failed node can restart when the failed node restarts. Users can be notified that in-flight transactions have been cancelled or rolled-back, and should be retried. Wherever possible, the transaction can be retried after reestablishing connections, in order to make use of resources on another live server. One example of Al reestablishing a connection is the event context as used for sending events to Al from an event router.

In the event of an admin server failure, an Al application can do the tasks listed with respect to the crash of a cluster server. The Al application should still be able to boot and reboot successfully using the previous domain and server configuration.

The use of server clustering allows an Al component, such as an event-forwarding server, event queue, or JMS server, to be used in a scalable and highly available fashion. A highly available component does not have any single points of failure, and can migrate services from failed nodes to live nodes in a cluster. Any service offered by an Al component can be targeted to several nodes in a cluster. In the event of a node failure in the cluster, the services located on the failed node can be migrated to another live node in the cluster.

In the event of a crash of a cluster or managed server, the Al application can continue accepting new work. The acceptance of new work can include the deploying and undeploying of application views and connection factories, monitoring of old application views and connection factories, delivering events from adapters, and servicing both synchronous and asynchronous service invocations. An Al application can also support the manual migration of services on the failed node to a live node, such as a singleton MDB listening on a physical destination managed by a failed JMS server. Application integration can use a singleton MDB, such as if a customer needs ordered event processing.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system comprising:
 a cluster of servers;
 a database connected to said cluster of servers, wherein an event occurring within the database is propagated by an adapter out to the cluster of servers; and
 a message store and forward unit residing a server in the cluster of servers, wherein the message store and forward unit receives a message generated by the event occurring within the database system, stores the message and forwards the message to a recipient;
 wherein the message is stored using a distributed destination that includes multiple physical locations in the cluster associated with a single alias, such that said single alias identifies the distributed destination;
 wherein the message addressed to the alias is received by said server, such that the server receiving the message determines one of the multiple physical locations in the cluster associated with the alias and causes the message to be stored in said one of the multiple physical locations prior to the message being forwarded;
 wherein the server examines a load on each of the multiple physical locations and selects said one of the multiple physical locations for storing the message according to said load being examined; and
 wherein, in case of a failure of said server, the message store and forward unit is migrated to another server of the cluster.

2. The system of claim 1, wherein the store and forward unit includes a message queue.

3. The system of claim 1, wherein the store and forward unit includes a message processor.

4. The system of claim 1, further comprising:
 a list of registered event destinations for receiving said message, wherein the list of registered event destinations is configured by posting a message on a notification topic.

5. The system of claim 4, further comprising:
 a message driven bean that listens on the distributed destination and delivers the message to at least one of the list of registered event destinations.

6. The system of claim 5, wherein if delivery of the message fails, the message is rolled back to the distributed destination, such that the roll back uses a same alias but forwards the message to a different physical location in the cluster.

7. The system of claim 1, wherein the message is published to a distributed event topic that handles delivery of events to remote clients.

8. The system of claim 1, wherein the server receiving the message determines the physical location with the lightest load and creates the alias for the physical location and assigns the alias.

9. A method, comprising:
 maintaining a cluster of servers connected to a database, wherein an event occurring within the database is propagated by an adapter out to the cluster of servers;
 maintaining a message store and forward unit on at least one of the servers in the cluster;
 receiving a message generated by the event occurring within the database system by the message store and forward unit on the server, wherein the message store and forward unit stores the message and forwards the message to a recipient;

wherein the message is stored using a distributed destination that includes multiple physical destinations in the cluster associated with a single alias, such that said single alias identifies the distributed destination;

wherein the message addressed to the alias is received by said server, such that the server receiving the message determines one of the multiple physical locations in the cluster associated with the alias and causes the message to be stored in said one of the multiple physical locations prior to the message being forwarded;

wherein the server examines a load of each of the multiple physical destinations and selects said one of the multiple physical locations for storing the message containing according to said load examined;

wherein employing the message store and forward unit causes exactly one copy of each message to be delivered while simultaneously using the distributed destination with multiple physical locations to store the message; and wherein, in case of a failure of said server, the message store and forward unit is migrated to another server of the cluster.

10. The method of claim 9, wherein the store and forward unit includes a message queue.

11. The method of claim 9, wherein the store and forward unit includes a message processor.

12. The method of claim 9, further comprising:
a list of registered event destinations for receiving said message, wherein the list of registered event destinations is configured by posting a message on a notification topic.

13. The method of claim 12, further comprising:
a message driven bean that listens on the distributed destination and delivers the message to at least one of the list of registered event destinations.

14. The method of claim 13, wherein if delivery of the message fails, the message is rolled back to the distributed destination, such that the roll back uses a same alias but forwards the message to a different physical location in the cluster.

15. The method of claim 9, wherein the message is published to a distributed event topic that handles delivery of events to remote clients.

16. The method of claim 9, wherein the server receiving the message determines the physical location with the lightest load and creates the alias for the physical location and assigns the alias.

17. A system comprising:
a cluster of servers;
a database connected to said cluster of servers, wherein an event occurring within the database is propagated by an adapter out to the cluster of servers; and
a message store and forward unit residing on a server in the cluster of servers, wherein the message store and forward unit receives a message generated by the event occurring within the database system, stores the message and forwards the message to a recipient;
wherein the message is stored using a distributed destination that includes multiple physical locations in the cluster associated with a single alias, such that said single alias identifies the distributed destination;
wherein the message addressed to the alias is received by said server, such that the server receiving the message determines one of the multiple physical locations in the cluster associated with the alias and causes the message to be stored in said one of the multiple physical locations prior to the message being forwarded;
wherein employing the message store and forward unit causes exactly one copy of each message to be delivered while simultaneously using the distributed destination with multiple physical locations;
wherein, in case of a failure of said server, the message store and forward unit is migrated to another server of the cluster.

* * * * *

UNITED STATES PATENT AND TRADEMARK OFFICE
CERTIFICATE OF CORRECTION

| | | |
|---|---|---|
| PATENT NO. | : 7,840,611 B2 | Page 1 of 1 |
| APPLICATION NO. | : 11/685169 | |
| DATED | : November 23, 2010 | |
| INVENTOR(S) | : Timothy A. Potter et al. | |

It is certified that error appears in the above-identified patent and that said Letters Patent is hereby corrected as shown below:

On page 3, in column 1, under "Other Publications", line 13, delete "Developers's" and insert -- Developer's --, therefor.

On page 3, in column 2, under "Other Publications", line 26, delete "Leipzg," and insert -- Leipzig, --, therefor.

In column 1, line 7, delete "entitled"HIGH" and insert -- entitled "HIGH --, therefor.

In column 1, line 8, delete "AVAILABLILITY" and insert -- AVAILABILITY --, therefor.

In column 1, line 36, delete "Reguest" and insert -- Request --, therefor.

In column 3, line 33, after "failure" insert -- . --.

In column 3, line 64, delete "JNDl" and insert -- JNDI --, therefor.

Signed and Sealed this
Second Day of August, 2011

David J. Kappos
*Director of the United States Patent and Trademark Office*